(12) United States Patent
Jirka et al.

(10) Patent No.: US 8,789,155 B2
(45) Date of Patent: Jul. 22, 2014

(54) PURE OFFLINE SOFTWARE APPLIANCE CONFIGURATION

(75) Inventors: Ian Chase Jirka, Issaquah, WA (US); Krishnan Gopalan, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 184 days.

(21) Appl. No.: 12/631,877

(22) Filed: Dec. 7, 2009

(65) Prior Publication Data
US 2011/0138449 A1      Jun. 9, 2011

(51) Int. Cl.
*G06F 21/00* (2013.01)
*H04L 29/06* (2006.01)

(52) U.S. Cl.
USPC .................................. 726/7; 726/19; 713/100

(58) Field of Classification Search
USPC .................................................. 717/174, 175
See application file for complete search history.

(56) References Cited

U.S. PATENT DOCUMENTS

| | | | |
|---|---|---|---|
| 2004/0187104 A1* | 9/2004 | Sardesai et al. | 717/174 |
| 2007/0180497 A1* | 8/2007 | Popescu et al. | 726/4 |
| 2009/0083404 A1* | 3/2009 | Lenzmeier et al. | 709/221 |
| 2009/0164994 A1* | 6/2009 | Vasilevsky et al. | 718/1 |
| 2009/0216990 A1 | 8/2009 | Vick et al. | |
| 2009/0249284 A1 | 10/2009 | Antosz et al. | |

OTHER PUBLICATIONS

Glider, et al., "The Software Architecture of a SAN Storage Control System", Retrieved at <<http://www.gsd.inesc-id.pt/~ler/docencia/tfd0607/aplicbib/glider.pdf>>, IBM Systems Journal, vol. 42, No. 2, Jan. 2, 2003, pp. 232-249.

Kalibera, Tomas, "SOFA Support in C++ Environments Department of Software Engineering", Retrieved at <<http://dsrg.mff.cuni.cz/publications/kalibera-master.pdf>>, Dec. 13, 2001, pp. 58.

"Walkthrough: Service a Virtual Hard Disk Image Offline", Retrieved at <<http://technet.microsoft.com/en-us/library/dd799267(WS.10).aspx>>, May 4, 2009, p. 1.

"Subversion MultiSite Software Appliance ", Retrieved at <<http://www.wandisco.com/pdf/SubversionMultiSiteAppliance.pdf>>, Oct. 12, 2009, pp. 2.

"ISV Perspective: The Business Case for Software Appliances", Retrieved at <<http://www.vmworld.com/servlet/JiveServlet/previewBody/1181-102-1-1283/isv_perspective_062007.pdf; jsessionid=5D5FF496DECFC85D2F44B2D6C26224E5>>, Oct. 12, 2009, pp. 5.

"Client Integrity Application Note", Retrieved at <<http://www.netdefender.ch/fileadmin/mat/aep/Client_Integrity_App_Note_v1.2-pub.pdf>>, Oct. 12, 2009, pp. 6.

"Dell Virtual Appliance Portal", Retrieved at <<http://www1.euro.dell.com/content/topics/global.aspx/solutions/virtualize/virtualization/virtualization?c=uk&l=en&cs=ukbsdt1>>, Oct. 12, 2009, pp. 3.

* cited by examiner

Primary Examiner — Gilberto Barron, Jr.
Assistant Examiner — Devin Almeida
(74) Attorney, Agent, or Firm — Jim Sfekas; Kate Drakos; Micky Minhas

(57) ABSTRACT

One or more online configuration settings are received prior to deployment and execution of a software appliance. Once the configuration settings have been received, the online configuration settings can be utilized to configure a software appliance image prior to executing the image at a host computer. Once the application of the configuration settings to the image has been completed, the image may executed at a host computer.

18 Claims, 4 Drawing Sheets

PURE OFFLINE SOFTWARE APPLIANCE CONFIGURATION

BACKGROUND

In order to simplify the process of deploying software, an operating system and one or more applications can be configured and packaged together as a software appliance. A software appliance might be executed directly on the hardware of a host computer. This type of software appliance is commonly referred to as a physical appliance. A software appliance might also be configured to run as a virtual machine on a host computer. This type of software appliance is commonly referred to as a virtual software appliance.

Configuration of software appliances has typically required a user to provide certain configuration settings prior to deploying and executing the software appliance. These configuration settings are referred to herein as "offline" configuration settings. Previous mechanisms for configuring software appliances also require a user to provide other configuration settings after the software appliance has been deployed and execution of the appliance has started. These configuration settings are referred to herein as "online" configuration settings.

Requiring a user to provide configuration settings for a software appliance at two different times during the deployment process results in a sub-optimal user experience. Moreover, previous processes for configuring a software appliance might leave a software appliance in an unknown state if application of the online configuration settings fails for some reason. Troubleshooting this type of problem can be very time consuming and frustrating, especially when many software appliances are being deployed or managed.

It is with respect to these and other considerations that the disclosure made herein is presented.

SUMMARY

Concepts and technologies are disclosed herein for pure offline software appliance configuration. Through an implementation of the concepts and technologies presented herein, a software appliance can be configured with both offline configuration settings and online configuration settings prior to deployment and execution by a host computer. In this way, the process of configuring a software appliance can be streamlined for a user. Moreover, certain online configuration settings can be validated prior to deployment and execution of the software appliance, thereby reducing the possibility that configuration of the software appliance will fail at runtime.

According to one aspect presented herein, a software appliance image containing an operating system and one or more application programs can be configured with online and offline configuration settings prior to execution on a host computer. In particular, online configuration settings are received. As discussed briefly above, online configuration settings are settings that are utilized once execution of the software appliance has begun. For instance, online configuration settings might specify a product key for licensing an application in the software appliance image, a computer name and a domain for use by an operating system, a username and a password for a management account, or whether a user assents to sharing information regarding the operation of the operating system or applications in the software appliance.

Once the online configuration settings have been received, the online configuration settings can be utilized to configure the software appliance image prior to executing the image at a host computer. For instance, in one embodiment, the software appliance image is mounted. Once the image has been mounted, the contents of the image are modified to include the received offline configuration settings and the online configuration settings. Once the application of the configuration settings to the image has been completed, the image is unmounted. The image may then be deployed to the host computer upon which it will execute. The image might also be deployed prior to mounting and configuration. Because the online configuration settings have been received and applied to the software appliance image prior to execution, there is no need for additional user involvement in the configuration of the image at the time the image is started on the host computer.

According to another aspect, the software appliance image may be connected to a domain prior to execution. In particular, in one embodiment, a request to join a domain is transmitted to a domain controller on the domain. If the request to join the domain is granted, one or more authentication keys are received from the domain controller. The software appliance image is then configured for operation on the domain using the authentication keys prior to execution of the software appliance image at the host. Other settings might also be modified in order to configure the software appliance image for operation on the domain. In this manner, the software appliance image can be configured for operation on the domain prior to execution at the host. Moreover, a failure of the join domain request can be detected and rectified prior to execution of the software appliance image at the host.

It should be appreciated that the above-described subject matter might also be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
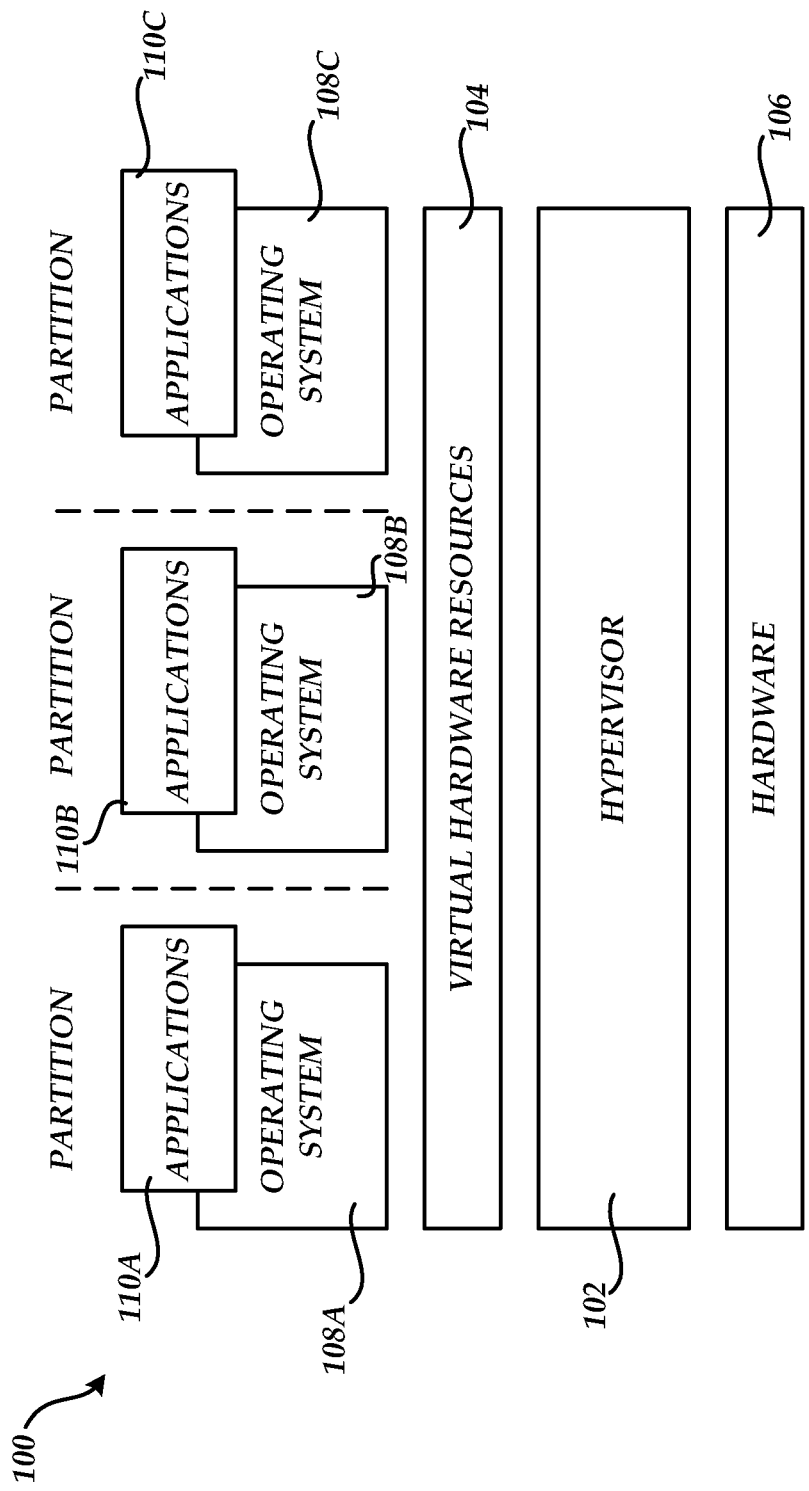
FIG. 1 is a computer software architecture diagram that illustrates an example of a suitable computing environment in which aspects of the subject matter described herein may be implemented.

The following detailed description is directed to technologies for pure offline software appliance configuration. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements throughout the several figures, aspects of a computing system, computer-readable storage medium, and computer-implemented methodology for pure offline software appliance configuration will be presented.

FIG. 1 is a computer software architecture diagram that illustrates an example of a suitable computing environment 100 in which aspects of the subject matter described herein may be implemented. In particular, FIG. 1 shows an illustrative software architecture for implementing a software appliance on a host computer as a virtual machine. As known in the art, virtualization allows a host computer to concurrently run multiple operating systems on a single computer. Each executing instance of an operating system is typically referred to as a virtual machine.

In order to enable the execution of virtual machines, a software hypervisor 102 may be executed to provide functionality for configuring, executing, and managing the operation of virtual machines. The hypervisor 102 is a layer of software that runs above the physical hardware 106 of the host computer upon which it executes, and below one or more operating systems 108A-108C. The hypervisor 102 might also be implemented in hardware.

The hypervisor 102 provides isolated execution environments called partitions. In the example shown in FIG. 1, the operating system 108A and the applications 110A are executing in a first partition, the operating system 108B and the applications 110B are executing in a second partition, and the operating system 108C and the applications 110C are executing in a third partition. The hypervisor 102 provides each partition with its own set of virtual hardware resources 104 (for example, memory, devices, and central processing unit ("CPU") cycles). The hypervisor 102 also controls and arbitrates access to the underlying hardware 106 as needed.

As discussed briefly above, an operating system and one or more applications are often configured and packaged together as a software appliance in order to simplify the process of deploying software. Multiple appliances might also be packaged together to implement a solution. In this regard, a software appliance might be configured to execute as a virtual machine within an environment such as the one illustrated in FIG. 1. This type of software appliance is commonly referred to as a virtual software appliance. It should be appreciated, however, that a software appliance might also be executed directly on the hardware 106 of a host computer. This type of software appliance is commonly referred to as a physical appliance. It should also be appreciated that while the embodiments presented herein are primarily described in the context of a virtual software appliance, the embodiments presented here for pure offline software configuration may also be utilized with physical appliances. Additional details regarding aspects of the embodiments presented herein for pure offline configuration of a software appliance will be described below with reference to FIGS. 2 and 3.

It should be appreciated that FIG. 1 is merely illustrative and that the embodiments presented herein might be utilized within many different types of virtualization environments that have been implemented in many different ways. The embodiments presented herein might also be utilized in an application virtualization environment.

Figure 2:
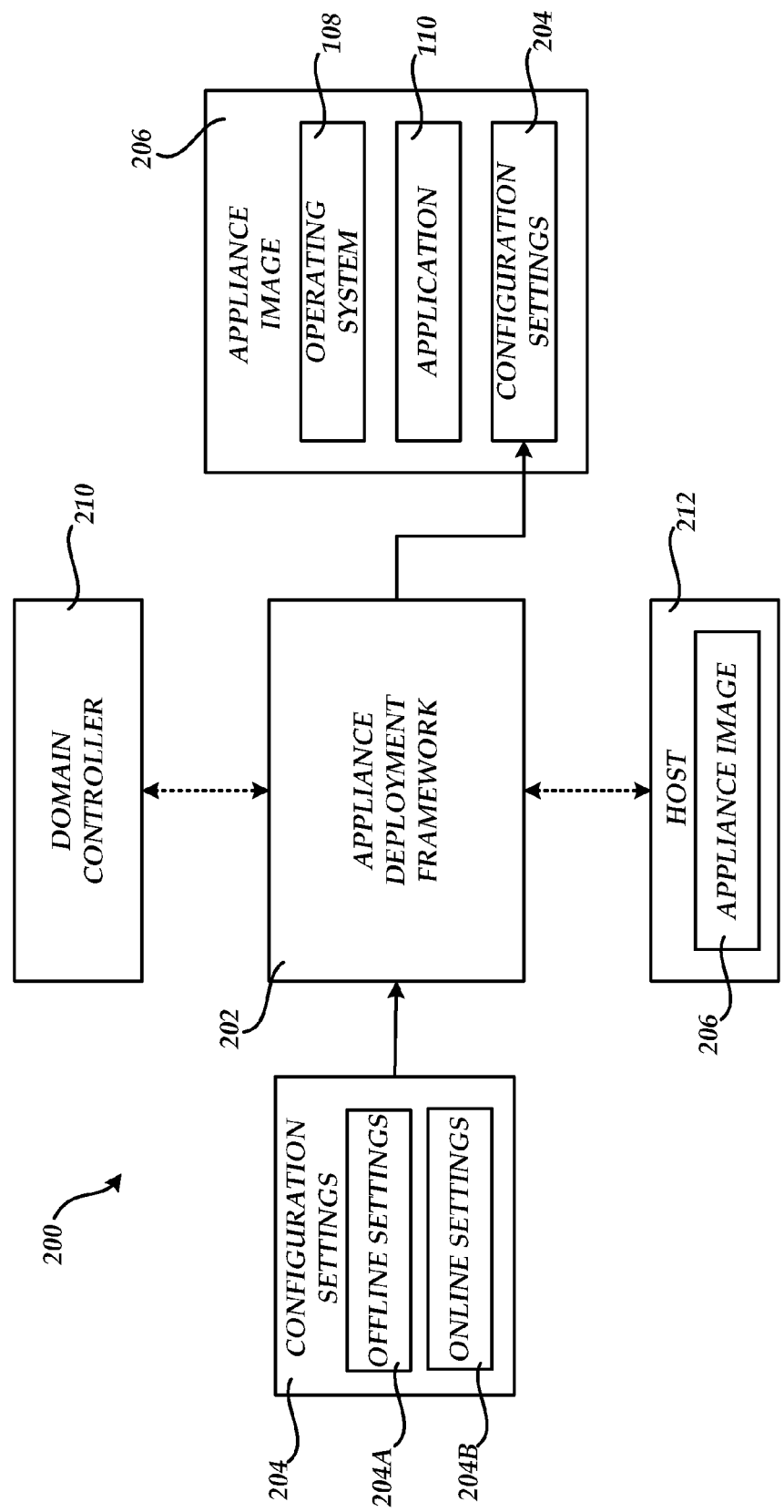
FIG. 2 is a computer software architecture diagram that illustrates aspects of an appliance deployment framework provided herein for pure offline configuration of a software appliance according to various embodiments presented herein.

FIG. 2 is a computer software architecture diagram that illustrates aspects of an appliance deployment framework 202 provided herein for pure offline configuration of a software appliance according to various embodiments presented herein. As will be described in greater detail below, the appliance deployment framework 202 provides functionality for configuring and deploying an appliance image 206 that implements a software appliance. It should be appreciated that the appliance deployment framework 202 may comprise a conventional application program configured for execution on a desktop or server computer, a command line tool, a software wizard, or an application implemented as a site accessible via the World Wide Web. Other implementations may also be utilized.

According to the embodiments presented herein, the appliance deployment framework 202 provides functionality for the pure offline configuration of an appliance image 206. As mentioned briefly above, the appliance image 206 implements a software appliance and may include an operating system 108 and an application program 110. The appliance image 206 may be implemented as a virtual hard disc image, an Open Virtualization Format Package, a Windows imaging format image ("WIM"), or in another type of image format capable of encapsulating an operating system and an application 110. According to embodiments, the appliance image 206 is configured for use with a hypervisor 102. It should be appreciated, however, that the appliance image 206 may also be configured for use with a physical appliance.

In order to configure the appliance image 206 in a purely offline manner, the appliance deployment framework 202 receives one or more configuration settings 204 prior to deployment and execution of the appliance image 206. In particular, the appliance deployment framework 202 may receive one or more offline configuration settings 204A and one or more online configuration settings 204B. As discussed briefly above, offline configuration settings are those settings that are required prior to deployment and execution of the appliance image 206. Online configuration settings are those settings that are not required before the appliance image 206 has been deployed to a host computer and execution of the appliance image 206 has started. The configuration settings 204 may be received through an appropriate user interface provided by the appliance deployment framework 202, may be retrieved from a configuration file, or may be provided to the appliance deployment framework 202 in another manner.

As will be discussed in greater detail below with reference to FIG. 3, the appliance deployment framework 202 receives the configuration settings 204 and applies the configuration settings 204 to the appliance 206 prior to executing the appliance image 206 at a host computer 212. Once the configuration settings 204 have been applied to the appliance image 206, the appliance deployment framework 202 may cause the appliance image 206 to be deployed to the host computer 212. This may entail, for instance, transmitting the appliance image 206 over a network to the host computer 212. Once the appliance image 206 has been deployed at the host computer 212, the appliance deployment framework 202 may also cause execution of the appliance image to begin at the host computer 212. Because the online configuration settings 204B have already been applied to the appliance image 206, minimal additional user intervention is required to configure the appliance image 206 for execution at the host computer 212 at startup time. It should be appreciated that, in other embodiments, the appliance deployment framework 202 might deploy the appliance image 206 to the host computer 212 prior to mounting and configuration.

It should be appreciated that, according to various embodiments, the offline settings 204A may specify a destination location on the host computer 212 for the appliance image 206, or a network interface on the host computer 212 to be utilized by the appliance image 206. Other offline settings 204A may also be specified.

The online settings 204B might specify a product license key for an application in the software appliance image, a computer name and a domain for use by the operating system 108 executing within the appliance image 206, a user name and a password for a management account, or an indication as to whether a user assents to sharing information regarding the operation of the operating system 108 or the applications 110. Other online settings 204B might also be specified and applied to the appliance image 206 prior to execution of the appliance image 206 on the host computer 212.

According to one implementation presented herein, the appliance deployment framework 202 also provides functionality for configuring the operating system 108 for connection to a domain prior to deployment and execution of the appliance image 206. In this embodiment, the appliance deployment framework 202 receives credentials for joining the domain. These credentials are then utilized by the appliance deployment framework 202 to transmit a request to join the domain to a domain controller 210. If the request to join the domain is granted, the domain controller 210 will provide one or more authentication keys and other configuration data to the appliance deployment framework 202 in response to the request.

If the domain join is successful, the appliance deployment framework 202 configures the appliance image 206 for operation on the domain using the authentication keys and configuration data provided by the domain controller 210 prior to deployment of the appliance image 206 to the host computer 212. It should be appreciated that the appliance deployment framework 202 may also apply other configuration settings to the appliance image 206 to enable the operating system 108 to operate on the domain. In this manner, the appliance image 206 can be configured for operation on a domain prior to execution of the appliance image 206 on the host computer 212. Additionally, the appliance deployment framework 202 may provide functionality for determining when an attempt to join a domain has failed, and for notifying a user of the appliance deployment framework 202 of such failure. In this manner, necessary action can be taken to address the failure of the domain join prior to modifying or deploying the appliance image 206 to the host computer 212. Additional details regarding this process will be provided below with respect to FIG. 3.

Figure 3:
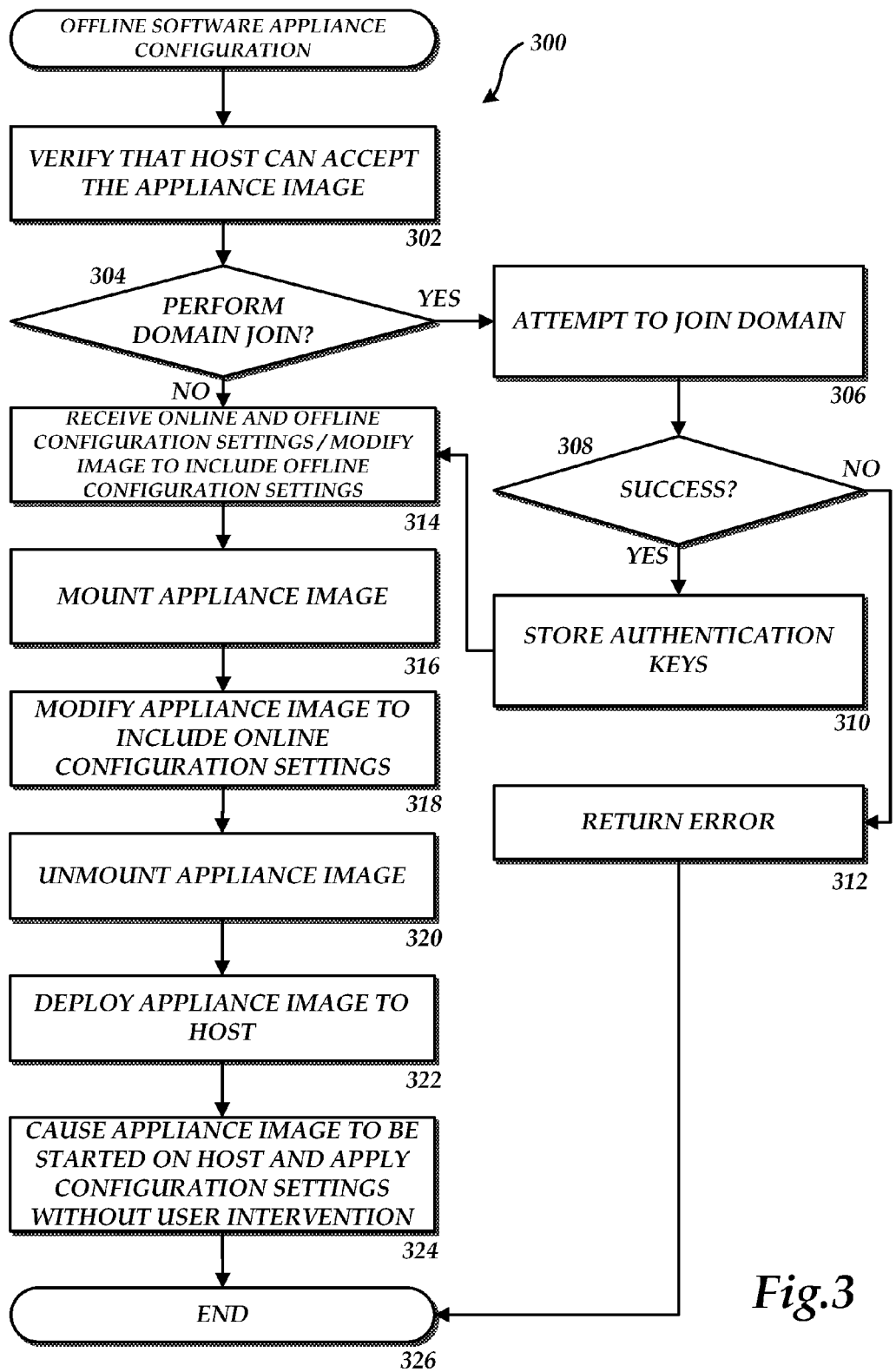
FIG. 3 is a flow diagram showing aspects of one illustrative routine provided herein for pure offline software appliance configuration.

Referring now to FIG. 3, additional details will be provided regarding the embodiments presented herein for pure offline software appliance configuration. In particular, FIG. 3 is a flow diagram showing a routine 300 that illustrates aspects of the operation of the appliance deployment framework 202 for pure offline software appliance configuration. It should be appreciated that the logical operations described herein with respect to FIG. 3 and the other FIGURES are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. It should also be appreciated that more or fewer operations may be performed than shown in the FIGURES and described herein. These operations may also be performed in a different order than those described herein.

The routine 300 begins at operation 302, where the appliance deployment framework 202 verifies that the host computer 212 can accept the appliance image 206. This may include, for instance, determining whether the host computer has sufficient resources to store and execute the appliance image 206, determining whether a user of the appliance deployment framework 202 has sufficient privileges to deploy an appliance image 206 to the host 212, and other types of functions. If the appliance deployment framework 202 verifies that the host computer 212 can accept the appliance image 206, the routine 300 proceeds to operation 304.

At operation 304, the appliance deployment framework 202 determines whether the appliance image 206 should be configured for operation on a domain. If so, the routine 300 proceeds from operation 304 to operation 306 where the appliance deployment framework 202 attempts to join the specified domain. As discussed above, the appliance deployment framework 202 may transmit a request to a domain controller 210 that includes credentials for joining the domain. If the domain controller 210 determines that the request to join the domain can be approved, the domain controller 210 will return authentication keys for use in joining the domain. Otherwise, the domain controller 210 will return an error to the appliance deployment framework 202.

From operation 306, the routine 300 proceeds to operation 308 where the appliance deployment framework 202 determines whether the domain was joined successfully. If not, the routine 300 proceeds to operation 312 where an error message is returned to the user of the appliance deployment framework 202. The routine 300 then proceeds from operation 312 to operation 326, where it ends. Alternatively, if a domain join fails the appliance deployment framework 202 may provide functionality for allowing a user to retry the join domain operation or continue configuring the appliance image without joining the domain.

If, at operation 308, the appliance deployment framework 202 determines that the domain was joined successfully, the routine 300 proceeds from operation 308 to operation 310. At operation 310, the authentication keys received from the domain controller 210 are stored for use in configuring the appliance image 206. The routine 300 then proceeds from operation 310 to operation 314.

If, at operation 304, the appliance deployment framework 202 determines that it is not necessary to join a domain, the routine 300 proceeds from operation 304 to operation 314. At operation 314, the appliance deployment framework 202 receives the configuration settings 204, including the offline configuration settings 204A and the online configuration settings 204B. Once the configuration settings 204 have been received, the offline configuration settings 204A are utilized to configure the appliance image 206 at operation 314. The routine 300 proceeds from operation 314 to operation 316.

At operation 316, the appliance deployment framework 202 mounts the appliance image 206 so that a file system defined therein can be modified. Once the appliance image 206 has been mounted, the routine 300 proceeds to operation 318 where the contents of the appliance image 206 are modified to include the online configuration settings 204B. In this regard, if the appliance image 206 is to be joined to a domain, the authentication keys received from the domain controller 210 may be stored in the appliance image 206 along with the configuration settings 204. As discussed above, the appliance deployment framework 202 may apply other changes to the mounted appliance image 206 to configure the appliance image 206 for operation on a domain. Once the appliance deployment framework 202 has completed modifying the appliance image 206, the routine 300 proceeds to operation 320 where the appliance image 206 is unmounted.

From operation 320, the routine 300 proceeds to operation 322, where the appliance deployment framework 202 deploys the appliance image 206 to the appropriate host computer 212. As discussed briefly above, this may include, for instance, copying the configured appliance image 206 to the host computer 212 over a local or wide area network. The offline configuration settings 204A may be utilized to determine the location to which the appliance image 206 should be copied at the host computer 212. Once the appliance deployment framework 202 has deployed the appliance image 206 to the host computer 212, the routine 300 proceeds to operation 324. As mentioned above, the appliance image 206 may be deployed to the host computer 212 prior to performing the mounting and configuring operations described above.

At operation 324, the appliance deployment framework 202 causes execution of the appliance image 206 to be started at the host computer 212. Program code may be executed by the operating system 108 or the application 110 to complete application of the online configuration settings 204B to the appliance image 206. It should be appreciated, however, that no additional user involvement is required at startup time to complete configuration of the appliance image 206 for operation on the host computer 212. From operation 324, the routine 300 proceeds to operation 326, where it ends.

It should be appreciated, that, in another embodiment, the functionality described herein as being performed by the appliance deployment framework 202 might be provided by a Web or network service. For instance, according to another implementation, a Web site may be provided that provides functionality for allowing a user to configure, purchase, and utilize one or more appliance images 206. For instance, several appliances might be purchased that a configured to address a particular customer need. In this embodiment, the Web site may be configured to collect the configuration settings 204 for the requested appliance image 206. The Web site may also be configured to inject the configuration settings 204 into the appliance image 206 as requested by the user.

Once the appliance image 206 has been configured in the manner requested by the user, the Web site may provide further functionality for executing the appliance image 206 and making the executing appliance image available to the user via the Internet. In this regard, the user may be able to select the particular operating system 108 and application 110 that are included in the appliance image 206. The Web site might provide functionality for creating a new appliance image 206 that includes the specified operating system 108 and application 110.

Figure 4:
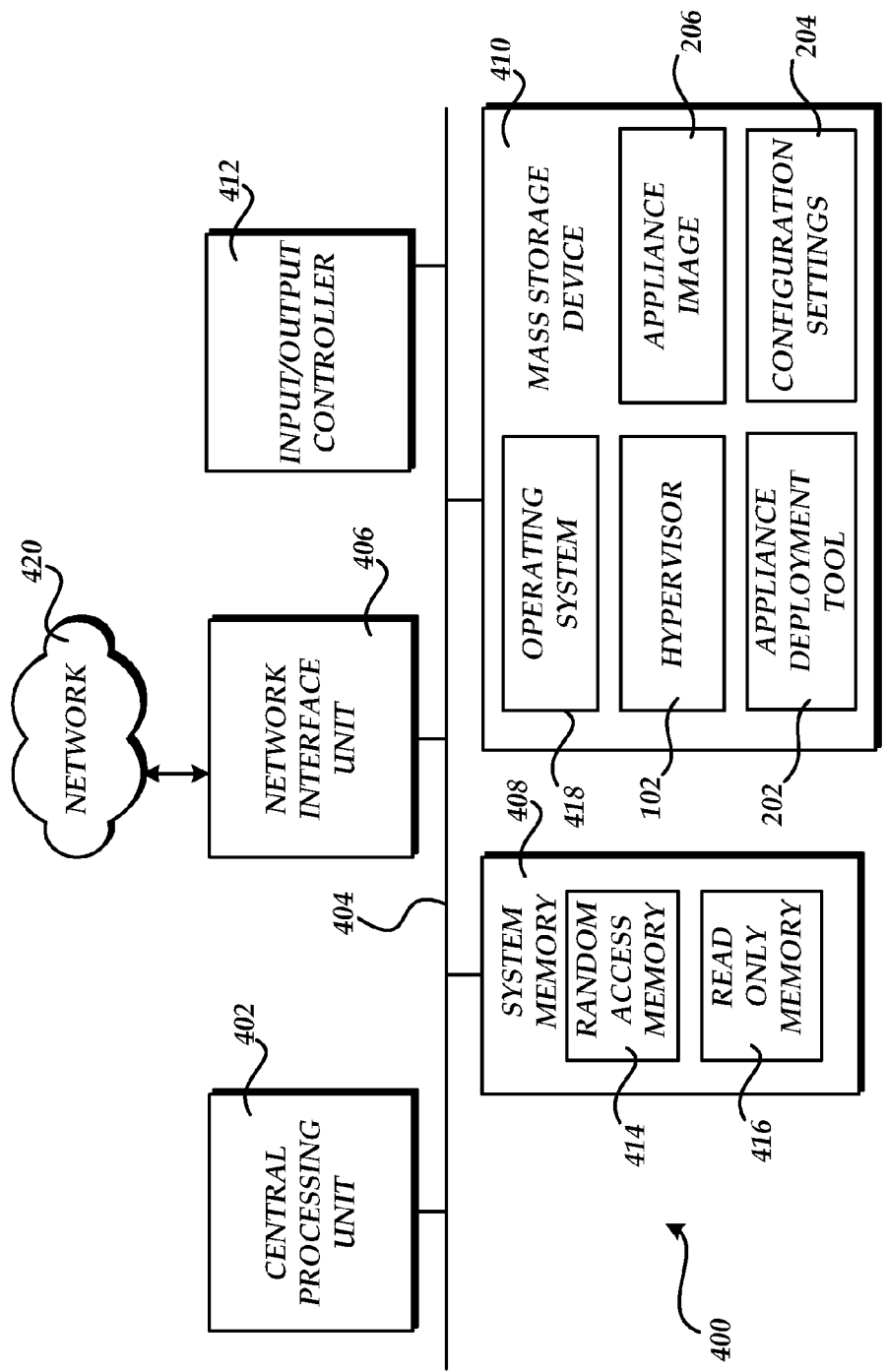
FIG. 4 is a computer architecture diagram showing an illustrative computer hardware and software architecture for a computing system capable of implementing aspects of the embodiments presented herein.

FIG. 4 shows an illustrative computer architecture for a computer 400 capable of executing the software components described herein for pure offline software appliance configuration. The computer architecture shown in FIG. 4 illustrates a conventional desktop, laptop, or server computer and may be utilized to execute any aspects of the software components presented herein.

The computer architecture shown in FIG. 4 includes a central processing unit 402 ("CPU"), a system memory 408, including a random access memory 414 ("RAM") and a read-only memory ("ROM") 416, and a system bus 404 that couples the memory to the CPU 402. A basic input/output system containing the basic routines that help to transfer information between elements within the computer 400, such as during startup, is stored in the ROM 416. The computer 400 further includes a mass storage device 410 for storing an operating system 418, application programs, and other program modules, which are described in greater detail herein.

The mass storage device 410 is connected to the CPU 402 through a mass storage controller (not shown) connected to the bus 404. The mass storage device 410 and its associated computer-readable media provide non-volatile storage for the computer 400. Although the description of computer-readable media contained herein refers to a mass storage device, such as a hard disk or CD-ROM drive, it should be appreciated by those skilled in the art that computer-readable media can be any available computer storage media that can be accessed by the computer 400.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 400.

According to various embodiments, the computer 400 may operate in a networked environment using logical connections to remote computers through a network such as the network 420. The computer 400 may connect to the network 420 through a network interface unit 406 connected to the bus 404. It should be appreciated that the network interface unit 406 may also be utilized to connect to other types of networks and remote computer systems. The computer 400 may also include an input/output controller 412 for receiving and processing input from a number of other devices, including a keyboard, mouse, or electronic stylus (not shown in FIG. 4). Similarly, an input/output controller may provide output to a display screen, a printer, or other type of output device (also not shown in FIG. 4).

As mentioned briefly above, a number of program modules and data files may be stored in the mass storage device 410 and RAM 414 of the computer 400, including an operating system 418 suitable for controlling the operation of a networked desktop, laptop, or server computer. The mass storage device 410 and RAM 414 may also store one or more program modules. In particular, the mass storage device 410 and the RAM 414 may store the hypervisor 102, the appliance deployment framework 202, an appliance image 206, and the configuration settings 204, each of which was described in detail above with respect to FIGS. 1-3. The mass storage device 410 and the RAM 414 may also store other types of program modules and data.

It should be appreciated that the software components described herein may, when loaded into the CPU 402 and executed, transform the CPU 402 and the overall computer 400 from a general-purpose computing system into a special-purpose computing system customized to facilitate the functionality presented herein. The CPU 402 may be constructed from any number of transistors or other discrete circuit elements, which may individually or collectively assume any number of states. More specifically, the CPU 402 may operate as a finite-state machine, in response to executable instructions contained within the software modules disclosed herein. These computer-executable instructions may transform the CPU 402 by specifying how the CPU 402 transitions between states, thereby transforming the transistors or other discrete hardware elements constituting the CPU 402.

Encoding the software modules presented herein may also transform the physical structure of the computer-readable media presented herein. The specific transformation of physical structure may depend on various factors, in different implementations of this description. Examples of such factors may include, but are not limited to: the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software may also transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 400 in order to store and execute the software components presented herein. It also should be appreciated that the computer 400 may comprise other types of computing devices, including hand-held computers, embedded computer systems, personal digital assistants, and other types of computing devices known to those skilled in the art. It is also contemplated that the computer 400 may not include all of the components shown in FIG. 4, may include other components that are not explicitly shown in FIG. 4, or may utilize an architecture completely different than that shown in FIG. 4.

Based on the foregoing, it should be appreciated that technologies for pure offline software appliance configuration are provided herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is defined by the claims set forth below.

What is claimed is:

1. A computer-implemented method for configuring a software appliance image the computer-implemented method comprising performing computer-implemented operations for:
   receiving, at a computer hosting a software execution environment, one or more online configuration settings for the software appliance image, the software appliance image comprising an operating system and an application that are packaged together, wherein the online configuration settings comprise settings that are not required before deployment and execution of the software appliance image has begun on a host computer;
   utilizing the online configuration settings to configure the software appliance image prior to deployment of the software appliance image to the host computer;
   transmitting a request to join a domain prior to deployment of the software appliance image to the host computer;
   receiving one or more authentication keys in response to the request to join the domain; and
   configuring the software appliance image for operation on the domain using the authentication keys prior to deployment and execution of the software appliance image.

2. The computer-implemented method of claim 1, further comprising deploying the software appliance image to the host computer.

3. The computer-implemented method of claim 1, wherein the online configuration settings comprise a product key for the application.

4. The computer-implemented method of claim 2, further comprising configuring the software appliance image based upon one or more offline configuration settings prior to execution of the software appliance image by the host computer, wherein the offline configuration settings comprise settings required prior to deployment and execution of the software appliance image on the host computer, and wherein the offline configuration settings specify a destination location at the host computer for the software appliance image.

5. The computer-implemented method of claim 4, wherein the offline configuration settings further specify a network interface at the host computer for use by the software appliance image.

6. The computer-implemented method of claim 1, wherein the online configuration settings specify a computer name and a domain for use by the operating system.

7. The computer-implemented method of claim 1, wherein the online configuration settings comprise a username and a password for a management account.

8. The computer-implemented method of claim 1, wherein the online configuration settings comprise data indicating whether a user assents to sharing information regarding the operation of the operating system or the application.

9. A computer-readable storage medium not consisting of a propagated signal or wave, having computer-readable instructions stored thereupon that, when executed by a computer, cause the computer to:
   receive one or more online configuration settings for a software appliance image comprising an operating system and an application that are packaged together, wherein the online configuration settings comprise settings that are not required before deployment and execution of the software appliance image has begun on a host computer;
receive one or more offline configuration settings for the software appliance image, wherein the offline configuration settings comprise settings required prior to deployment and execution of the software appliance image on the host computer;
mount the software appliance image;
modify contents of the mounted software appliance image using the online configuration settings to configure the software appliance image prior to deploying the software appliance image to the host computer;
unmount the software appliance image;
deploy the software appliance image to the host computer;
modify contents of the software appliance image using the offline configuration settings prior to execution of the software appliance image at the host computer;
transmit a request to join a domain prior to deployment of the software appliance image to the host computer;
receive one or more authentication keys in response to the request to join the domain; and
configure the software appliance image for operation on the domain using the authentication keys prior to deployment and execution of the software appliance image.

10. The computer-readable storage medium of claim 9, wherein the offline configuration settings specify a destination location at the host computer for the software appliance image.

11. The computer-readable storage medium of claim 9, wherein the offline configuration settings further specify a network interface at the host computer for use by the software appliance image.

12. The computer-readable storage medium of claim 9, wherein the online configuration settings specify a product key for the application.

13. The computer-readable storage medium of claim 9, wherein the online configuration settings specify a computer name and a domain for use by the operating system.

14. The computer-readable storage medium of claim 9, wherein the online configuration settings comprise a username and a password for a management account.

15. The computer-readable storage medium of claim 9, wherein the online configuration settings comprise data indicating whether a user assents to sharing information regarding the operation of the operating system or the application.

16. The method of claim 1, further comprising:
mounting the software appliance image at the computer;
modifying contents of the mounted software appliance image using the online configuration settings to configure the software appliance image prior to deploying the software appliance image to the host computer;
unmounting the software appliance image; and
deploying the software appliance image to the host computer for execution.

17. The computer-implemented method of claim 1, further comprising:
receiving, at the computer, data specifying the operating system to include in the software appliance image, the operating system being selected from a plurality of operating systems;
receiving, at the computer, data specifying the application to include in the software appliance image, the application being selected from a plurality of applications; and
creating the software appliance image comprising the operating system and the application.

18. A computer comprising a processor and memory storing computer-executable instructions that, when executed by the processor, cause the computer to:
receive online configuration settings for a software appliance image comprising an operating system and an application that are packaged together, wherein the online configuration settings comprise settings that are not required before deployment and execution of the software appliance image has begun on a host computer;
utilize the online configuration settings to configure the software appliance image prior to deployment of the software appliance image to the host computer;
transmit a request to join a domain prior to deployment of the software appliance image to the host computer;
receive one or more authentication keys in response to the request to join the domain; and
configure the software appliance image for operation on the domain using the authentication keys prior to deployment and execution of the software appliance image; and
deploy the software appliance image to the host computer.

* * * * *